US007165584B2

(12) United States Patent
Lin et al.

(10) Patent No.: US 7,165,584 B2
(45) Date of Patent: Jan. 23, 2007

(54) RUBBER COMPOSITIONS AND VULCANIZATES COMPRISING NYLON-CONTAINING COPOLYMERS

(75) Inventors: Chenchy Jeffrey Lin, Hudson, OH (US); William L Hergenrother, Akron, OH (US); Terrence E Hogan, Akron, OH (US); Shunji Araki, Copley, OH (US)

(73) Assignee: Bridgestone Corporation, Tokyo (JP)

( * ) Notice: Subject to any disclaimer, the term of this patent is extended or adjusted under 35 U.S.C. 154(b) by 276 days.

(21) Appl. No.: 10/262,279

(22) Filed: Oct. 1, 2002

(65) Prior Publication Data

US 2004/0063854 A1   Apr. 1, 2004

(51) Int. Cl.
B60C 1/00 (2006.01)
C08K 3/04 (2006.01)
C08F 36/00 (2006.01)

(52) U.S. Cl. .............. 152/151; 152/532; 524/495; 524/498; 525/332.8

(58) Field of Classification Search .............. 524/495, 524/496; 152/532
See application file for complete search history.

(56) References Cited

U.S. PATENT DOCUMENTS 3,838,108 A   9/1974   Hergenrother et al. ..... 260/77.5
3,853,796 A   12/1974  Oldack et al. ................. 260/5
3,859,382 A   1/1975   Hergenrother et al. ...... 260/859
4,070,344 A   1/1978   Hergenrother et al. ..... 260/77.5
4,157,429 A   6/1979   Hergenrother et al. ...... 521/137
4,157,430 A   6/1979   Hergenrother et al. ...... 521/137
4,298,707 A   11/1981  Hergenrother et al. ........ 521/95
4,708,987 A   11/1987  Hergenrother et al. ...... 525/184
5,091,471 A   2/1992   Graves et al. ................ 525/90
5,238,997 A   8/1993   Bauer et al. .................. 525/66
6,401,780 B1 * 6/2002  Patitsas et al. ............... 152/532
2003/0166772 A1 * 9/2003  Ajbani et al. ................. 525/66

FOREIGN PATENT DOCUMENTS

JP          58019343 A  *  2/1983

OTHER PUBLICATIONS

Hans-Georg Elias, Macromolecules 2, 1977, Plenum Press, p. 1000.*
Brandrup et al. Polymer Handbook, Fourth Edition 1999, Wiley-Interscience Publication, p. VI-159.*

* cited by examiner

Primary Examiner—Tae H. Yoon
(74) Attorney, Agent, or Firm—Meredith E. Palmer; Arthur M. Reginelli

(57) ABSTRACT

A tire comprising a tread, where the tread includes a vulcanized rubber, from about 5 to about 80 parts by weight of a nylon-containing block copolymer per 100 parts by weight of the vulcanized rubber, and from about 1 to about 100 parts by weight filler per 100 parts by weight of the vulcanized rubber.

39 Claims, No Drawings

RUBBER COMPOSITIONS AND VULCANIZATES COMPRISING NYLON-CONTAINING COPOLYMERS

FIELD OF THE INVENTION

This invention relates to tire tread rubber compositions and vulcanizates therefrom that comprise nylon-containing block copolymers.

BACKGROUND OF THE INVENTION

Hysteresis loss and storage modulus are properties of rubber that have a significant impact on tire tread performance. Hysteresis loss can be defined by the formula $\tan \delta = G''/G'$, where $G''$ is a measure of the dynamic loss modulus and $G'$ is the measure of storage modulus, which is indicative of hardness. Generally, as the temperature of a tire increases, $G'$ decreases. As a result, there may be a decrease in handling.

By employing a greater amount of filler and increasing the crosslink density of the rubber, $G'$, as well as other mechanical properties, can be increased. These approaches, however, lead to low elasticity, higher hysteresis loss, or poor aging properties. The addition of thermoplastic polymers to rubber vulcanizates has also been proposed to alleviate $G'$ decreases, but the incompatibility between thermoplastics and rubber likewise can be deleterious to many of the rubber properties.

There is, therefore, a need to overcome the problems associated with the loss of $G'$ at elevated temperatures in tire treads.

SUMMARY OF THE INVENTION

In general the present invention provides a tire comprising a tread, where the tread includes a vulcanized rubber, from about 5 to about 80 parts by weight of a nylon-containing block copolymer per 100 parts by weight of the vulcanized rubber, and from about 1 to about 100 parts by weight filler per 100 parts by weight of the vulcanized rubber.

The present invention also includes a tire component comprising vulcanized rubber, a nylon-containing block copolymer, and a filler, where the tread is characterized by having an elongation in excess of 100%.

The present invention further a process for fabricating a tire, the method comprising mixing a rubber, a filler, a nylon-containing block copolymer, and a curative to form a vulcanizable composition of matter, extruding the vulcanizable composition of matter into an uncured tread extrudate, fabricating an uncured tire, and curing the uncured tire.

The addition of nylon-containing copolymers to tire tread formulations has surprisingly been found to provide tire treads with improved mechanical properties, improved aging properties, improved wet traction, and improved rolling resistance (i.e., less hysteresis loss).

DETAILED DESCRIPTION OF ILLUSTRATIVE EMBODIMENTS

Tire treads and similar tire components are prepared from rubber compositions comprising a base rubber, a nylon-rubber block copolymer, a filler, and a vulcanizing agent. Other additives typically employed in rubber compositions, especially those used to fabricate tire treads, may also be included.

Both synthetic and natural rubber may be employed as the base rubber. These rubbers, which may also be referred to as elastomers, include, without limitation, natural rubber, synthetic polyisoprene, poly(styrene-co-butadiene), polybutadiene, poly(styrene-co-butadiene-co-isoprene), poly(styrene-co-isoprene), and mixtures thereof.

The nylon-containing block copolymers employed are known. For example, useful copolymers are disclosed in U.S. Pat. Nos. 3,853,796, 3,859,3882, 4,070,344, 4,157,429, 4,157,430, 4,298,707, 4,708,987, and 5,091,471, which are incorporated herein by reference. These block copolymers include at least one rubbery segment or block and at least one nylon segment or block, which is a hard block. The preferred copolymers are di-block copolymers.

The rubbery block of the nylon-containing block copolymer is characterized by having a glass transition temperature ($T_g$) that is less than 0° C., preferably less than –10° C., more preferably less than –20° C., and even more preferably less than –30° C.

The molecular weight of the rubbery block of the copolymer may vary. Preferably, the segments will have a number average molecular weight of from about 5 to about 300 kg/mole, more preferably from about 10 to about 200 kg/mole, and even more preferably from about 30 to about 150 kg/mole.

The rubbery segment of the nylon-containing block copolymers may comprise, but is not limited to, polybutadiene, polyisoprene, poly(styrene-co-butadiene), poly(styrene-co-butadiene-co-isoprene), and poly(styrene-co-isoprene).

The nylon block of the nylon-containing block copolymer is characterized by having a melt temperature ($T_m$) that is greater than 180° C., preferably greater than 190° C., more preferably greater than 210° C., and even more preferably greater than 220° C.

The molecular weight of the nylon block of the copolymer may vary. Preferably, the segments will have a number average molecular weight of from about 3 to about 50 kg/mole, more preferably from about 5 to about 30 kg/mole, and even more preferably from about 10 to about 20 kg/mole.

The nylon segment of the nylon-containing block copolymers may comprise, but is not limited to, polycarprolactam [Nylon-6], poly(11-aminoundecanoic acid) [Nylon-11], polycaproamide [Nylon-6], polyundecanoamide [Nylon-11], poly(caproamide-co-heptanoamide) [Nylon-6/7], and poly[(7-aminoheptanoic acid)-co-(11-aminoundecanoic acid)] [Nylon 7/11].

Preferred nylon-containing block copolymers include, but are not limited to, poly(butadiene-co-styrene)-block-(polycaprolactam), poly(polybutadiene)-block-(polycaprolactam), poly(butadiene-co-isoprene)-block-(polycaprolactam), and poly(styrene-co-isoprene-co-butadiene)-block-(polycaprolactam).

The preferred nylon-block copolymers preferably include from about 10 to about 90% by weight rubbery block, more preferably from about 30 to about 80% by weight rubbery block, and even more preferably from about 50 to about 70% by weight rubbery block based upon the entire weight of the block copolymer.

Methods for preparing useful nylon-containing block copolymers are known as described in U.S. Pat. Nos. 3,853,796, 3,859,3882, 4,070,344, 4,157,429, 4,157,430, 4,298,707, 4,708,987, and 5,091,471, which are incorporated herein by reference. In one preferred method, as disclosed in U.S. Pat. No. 3,838,108, a di-block copolymer is prepared by anionically polymerizing diene monomer, such as 1,3-butadiene, alone or together with vinyl aromatic monomer such as styrene, to form a living polymer. The living polymer is then terminated or reacted with a polyisocyanate or polyisothiocyanate monomer to produce end-capped polymers having at least one unreacted isocyanate or isothiocyanate functionality. The subsequent addition of nylon-forming monomer that will undergo anionic polymerization and that include an active hydrogen will result in the formation of a nylon segment that is attached to the diene segment via the isocyanate or isothiocyanate functionality. The polymerization of the nylon forming monmer is carried out at a temperature below the melting point of the corresponding nylon, and preferable at a temperature between 120° and 180° C.

Useful fillers include organic and inorganic fillers. The organic fillers include carbon black and starch. The inorganic fillers may include silica, aluminum hydroxide, magnesium hydroxide, clays (hydrated aluminum silicates), and mixtures thereof.

A coupling agent may optionally be added when an inorganic filler such as silica is used. Coupling agents include those compounds that are believed to react with both the rubber and the inorganic filler. One coupling agent conventionally used is bis-[3(triethoxysilyl) propyl]-tetrasulfide, which is commercially available under the tradename SI69 (Degussa, Inc.; New York, N.Y.). Other coupling agents include bis-[3(triethoxysilyl) propyl]-disulfide, which is commercially available under the tradename Silquest™ (Crompton; Greenwich, Conn.), mercapto propyl alkoxy silane, which is commercially available under the tradename Ciptane™ (Dow Corning; Midland, Mich.), and dithio diproprionic acid or carboxylic acid disulfides, which are commercially available from Aldrich Chemical Company. In general, these coupling agents should be used in an amount from about 0.1 to 20% by weight based upon the weight of the inorganic filler.

Shielding and dispersing agents, which prevent or alleviate the agglomeration of inorganic filler particles such as silica, may also be used. Typically, these agents react or interact with the filler. Exemplary dispersing or shielding agents include silanes, amines, diols, polyethers, amides, and sugar fatty acid esters. U.S. Pat. Nos. 5,719,207, 5,780,538, 5,717,022, and EP 0890606 are incorporated herein by reference in this regard. Specific examples of these agents include sugar, fatty acids such as sorbitan fatty acids which are available from BASF (Mount Olive, N.J.), and octyl triethoxy silane, which is available from Dow Corning (Midland, Mich.). Generally, these shielding or dispersing agents may be used in an amount from about 0.1 to about 20% by weight based on the weight of the inorganic filler. In preferred embodiments, the coupling agents, shielding agents, and dispersing agents may be used in combination.

A multitude of rubber curing agents may be employed. For example, sulfur or peroxide-based curing systems may be employed. Also, see Kirk-Othmer, ENCYCLOPEDIA OF CHEMICAL TECHNOLOGY, 3$^{rd}$ Edition, Wiley Interscience, N.Y. 1982, Vol. 20, pp. 365–468, particularly VULCANIZATION AGENTS AND AUXILIARY MATERIALS pp. 390–402, or Vulcanization by A. Y. Coran, ENCYCLOPEDIA OF POLYMER SCIENCE AND ENGINEERING, 2$^{nd}$ Edition, John Wiley & Sons, Inc., 1989, which are incorporated herein by reference. Vulcanizing agents may be used alone or in combination.

The rubber compositions and tire components may also include other compounding additives such as accelerators, oils, waxes, scorch inhibiting agents, processing aids, antidegradants, processing oils, zinc oxide, optional tackifying resins, optional reinforcing resins, optional fatty acids, and optional peptizers.

In addition to the nylon-containing block copolymer, the tire tread compositions of this invention may optionally include free nylon particles. These nylon particles may comprise the same or different nylon that constitutes the nylon segment of the nylon-containing block copolymer. Where free nylon is present together with the nylon-containing block copolymer within the rubber compositions of this invention, the nylon particles, which can be attributed to both free nylon and the hard domains of the block copolymers, are characterized by having an average particle size (as measured by average diameter), of from about 70 nm to about 5,000 nm, preferably from about 80 nm to about 1,000 nm, and more preferably from about 100 nm to about 800 nm.

The rubber compositions employed to make tire treads according to the present invention generally include from about 5 to about 80, preferably from about 10 to about 60, and even more preferably from about 20 to about 40 parts by weight of the nylon-containing copolymer per 100 parts by weight of the base rubber (phr).

Fillers, such as carbon black, silica or aluminum hydroxide, are typically employed in an amount from about 1 to about 100 parts by weight phr, preferably from about 20 to about 90 parts by weight phr, and more preferably from about 40 to about 80 parts by weight phr.

Those skilled in the art will be able to choose a useful amount of the other ingredients that may be employed in practicing the present invention. For example, it is generally known in the art of making tire components, such as treads, that sulfur is typically should be employed in an amount from about 0.5 to about 10 parts by weight phr, and preferably from about 1 to about 6 parts by weight phr. Oils are typically employed in an amount from about 1 to about 60 parts by weight phr, and preferably in an amount from about 1 to about 50 parts by weight phr. Zinc oxide is typically employed in an amount from about 0.5 to about 8, and preferably from about 1 to about 5 parts by weight phr.

When included, the amount of free nylon within the tread compositions is from about 0.01 to about 10 parts by weight phr, preferably from about 0.05 to about 5 parts by weight phr, and more preferably from about 0.1 to about 2 parts by weight phr.

The tire tread formulations are mixed or compounded by using mixing equipment and procedures conventionally employed in the art. Preferably, an initial masterbatch is prepared that includes the rubber component and the reinforcing fillers, as well as other optional additives such as processing oil and antioxidants. The nylon-containing block copolymer is preferably added during preparation of the initial masterbatch. To prevent premature vulcanization (scorch), this initial masterbatch generally excludes the vulcanizing agents. Once this initial masterbatch is processed, the vulcanizing agents are blended into the composition at lower temperatures. Rubber compounding techniques and the additives employed therein are generally known as disclosed in *The Compounding and Vulcanization of Rubber,* by Stevens in RUBBER TECHNOLOGY SECOND EDITION (1973 Van Nostrand Reinhold Company). The mixing conditions and procedures applicable to silica-filled tire formulations are also well known as described in U.S. Pat. Nos. 5,227,425, 5,719,207, 5,717,022, as well as EP 0890606, all of which are incorporated herein by reference.

The composition can then be processed into tire treads according to ordinary tire manufacturing techniques including standard rubber molding and curing techniques. Typically, vulcanization is effected by heating the vulcanizable composition; e.g., it is heated to about 170° C. Cured or crosslinked polymers may be referred to as vulcanizates, which are generally three-dimensional polymeric networks that are thermoset. The other ingredients, such as the functionalized polyolefin and fillers, are generally dispersed throughout this thermoset network.

As noted above, the rubber formulations of this invention provide improved tire treads. The benefits of this invention are also advantageously observed in those tire components that have an elongation in excess of 100%, more advantageously in excess of 200%, and even more advantageously in excess of 300%. As a result, the formulations of this invention can likewise be used to provide other similar tire components such as a bead area, belt skim, tire body, or side wall. Pneumatic tires can be made according to U.S. Pat. Nos. 5,866,171; 5,876,527; 5,931,211; and 5,971,046, which are incorporated herein by reference.

In order to demonstrate the practice of this invention, the following examples have been prepared and tested. The examples should not, however, be viewed as limiting the scope of the invention. The claims will serve to define the invention.

EXAMPLES

Example I

Nylon-containing block copolymers (poly(butadiene-co-styrene)-block Nylon 6) (SBR-b-Nylon) were prepared by first synthesizing living poly(styrene-co-butadiene). Specifically, butyllithium was used as an initiator with potassium t-amylate, which was used to control the polymer microstructure. The characteristics of these polymers are set forth I Table I.

TABLE I

| Sample No. | Control | 1 | 2 | 3 |
|---|---|---|---|---|
| Mn (kg/mol) | 144 | 29 | 57.2 | 28.4 |
| MWD | 1.03 | 1.09 | 1.10 | 1.11 |
| Styrene in SBR (%) | 28 | 29 | 29 | 29 |
| Vinyl PBD in SBR (%) | 38 | 47 | 47 | 47 |
| Tg ° C. | −43 | −13.8 | −14.4 | −12 |

Tolylene-2,4-diisocyanate (TDI) in hexane was then added to the reactor (74° C.) to endcap these living polymers. The characterization data of these TDI endcapped polymers are set forth in Table II.

TABLE II

| Sample No. | 1 | 2 | 3 |
|---|---|---|---|
| Mn (kg/mol) | 43.2 | 85.5 | 42.3 |
| MWD | 1.33 | 1.39 | 1.34 |
| TDI/BuLi mole ratio | 1.5 | 3.0 | 1.0 |

Molten ε-caprolactam was added to the reactor and the temperature was set at 171° C. to form the Nylon 6 and connect the TDI-endcapped polymer through the condensation reaction between the isocyanate and amine functionalities. The characterization data of the final SBR-b-Nylon block copolymer product is set forth in Table III.

TABLE III

| Sample No. | 1 | 2 | 3 |
|---|---|---|---|
| Mn (kg/mol) | 50.1 | 98.3 | 50.2 |
| MWD | 1.40 | 1.37 | 1.39 |
| Wt % of Nylon 6 (%) | 31.3 | 35.4 | 30.9 |
| Heat of Fusion kJ/mg | 14.6 | 16.48 | 14.4 |
| Melting $T_m$ (° C.) | 210.4 | 212.4 | 210.9 |
| Calculated % of free Nylon 6 | 54 | 77 | 35 |

The number average molecular weight (Mn) and molecular weight distribution (MWD) were determined by GPC while the polymer microstructure was determined by NMR. The Tg and crystal information (melting temperature Tm and crystal heat of fusion) were measured by DSC.

Example II

Eight tire tread stocks were prepared using the formulation set forth in Table IV and the mixing conditions set forth in Table V. The mixing took place in a 310 gram Brabender set at 60 r.p.m. The amount of the base rubber and nylon-containing block copolymer employed in each of the respective tread stocks is set forth in Table VI. Also included in Table VI is data obtained from tests performed on the uncured tread stocks as well as data obtained from tests performed on cured samples (vulcanizates).

TABLE IV

| | Phr |
|---|---|
| Poly(styrene-co-butadiene) | varied |
| Nylon-containing block copolymer | varied |
| Carbon Black | 41.00 |
| Wax | 1.00 |
| Antioxidant [N-(1,3 dimethylbutyl)-N'-phenyl-p-phenylene-diamine | 0.95 |
| Sulfur | 1.30 |
| Steric Acid | 2.00 |
| Accelerator [N-Cyclohexyl-2-benzothiazolsulfenamine] | 1.70 |
| Zinc oxide | 2.5 |
| Diphenyl Guanidine | 0.3 |

TABLE V

| Master Batch Stage 1 | |
|---|---|
| Initial Temperature | 100° C. |
| 0 sec | charging polymers and nylon-containing copolymer |
| 30 sec | charging carbon black and all pigments |
| 5 min. | drop |
| Drop temperature | 185° C. |
| Remill 1 Batch Stage | |
| Initial Temperature | 100° C. |
| 0 sec | charging remilled stock |
| Drop Temperature | 165° C. |
| Final Batch Stage | |
| Initial Temperature | 90° C. |
| 0 sec | charging remilled stock |
| 30 sec | charging curing agent and accelerators |
| Drop Temperature | 105° C. |

TABLE VI

| Tread Stock | 1 | 2 | 3 | 4 | 5 | 6 | 7 | 8 |
|---|---|---|---|---|---|---|---|---|
| Polymer Additives | | | | | | | | |
| Control (Base Rubber) | 100 | 100 | 92.23 | 93.54 | 92.08 | 100 | 100 | 100 |
| Nylon 6 particles | 0 | 3.54 | 0 | 0 | 0 | 0 | 0 | 0 |
| Sample 1 | 0 | 0 | 11.31 | 0 | 0 | 11.31 | 0 | 0 |
| Sample 2 | 0 | 0 | 0 | 10 | 0 | 0 | 10 | 0 |
| Sample 3 | 0 | 0 | 0 | 0 | 11.45 | 0 | 0 | 11.46 |
| Uncured Stock Characteristics | | | | | | | | |
| $ML_{1+4}$ @ 130° C. | 31.74 | 30.8 | 30.1 | 32.86 | 30.51 | 28.32 | 30.31 | 28.80 |
| Bound Rubber | 6.43 | 9.26 | 12.72 | 12.23 | 13.40 | 13.21 | 13.05 | 12.62 |
| Tensile Properties @ 25° C. | | | | | | | | |
| M @ 50% strain (MPa) | 1.21 | 1.14 | 1.39 | 1.49 | 1.39 | 1.39 | 1.38 | 1.35 |
| M @ 300% strain (MPa) | 8.73 | 7.24 | 10.46 | 11.05 | 11.04 | 9.91 | 9.64 | 9.66 |
| Tensile Strength @ break (MPa) | 15.68 | 16.22 | 18.69 | 18.80 | 19.64 | 16.51 | 17.73 | 17.87 |
| Elongation @ break (%) | 463 | 496 | 475 | 456 | 475 | 445 | 478 | 479 |
| Toughness (MPa) | 31.32 | 34.47 | 39.62 | 37.80 | 41.12 | 32.71 | 37.36 | 37.50 |
| Tensile Properties @ 100° C. | | | | | | | | |
| M @ 50% strain (MPa) | 0.66 | 0.93 | 0.79 | 0.90 | 0.78 | 0.76 | 0.73 | 0.74 |
| M @ 300% strain (MPa) | 6.35 | 7.06 | 8.11 | 8.75 | 8.63 | 8.26 | 7.47 | 7.36 |
| Tensile Strength @ break (MPa) | 6.61 | 7.06 | 8.11 | 8.75 | 7.73 | 6.90 | 6.38 | 6.79 |
| Elongation @ break (%) | 313 | 274 | 312 | 314 | 325 | 340 | 329 | 317 |
| Toughness (MPa) | 8.62 | 8.12 | 10.35 | 11.37 | 11.38 | 10.12 | 11.56 | 9.55 |
| Tear Strength @ 100° C. (kN/m) | 32.76 | 27.51 | 33.99 | 32.94 | 29.43 | 35.04 | 32.94 | 32.41 |
| Tensile Properties @ 100° C. (after thermal aging) | | | | | | | | |
| M @ 50 (MPa) | 1.04 | 1.18 | 1.03 | 1.13 | 1.08 | 0.93 | 0.987 | 1.01 |
| Tensile Strength @ break (MPa) | 6.89 | 6.68 | 8.99 | 8.97 | 7.81 | 7.73 | 8.38 | 8.24 |
| Elongation @ break (%) | 243 | 212 | 273 | 268 | 249 | 289 | 291 | 266 |
| Toughness (MPa) | 7.17 | 6.59 | 10.07 | 10.13 | 8.24 | 9.39 | 10.21 | 9.86 |
| Tear Strength @ 100° C.(kN/m) | 32.76 | 27.51 | 33.99 | 32.94 | 29.43 | 35.04 | 32.94 | 32.41 |
| Dynamic Viscoelastic Properties | | | | | | | | |
| 0° C. tan δ (MPa) (temperature sweep) | 0.3268 | 0.3261 | 0.3594 | 0.3551 | 0.3608 | 0.3539 | 0.3543 | 0.3498 |
| 50° C. tan δ (MPa) (temperature sweep) | 0.2144 | 0.2169 | 0.2171 | 0.2151 | 0.2221 | 0.2118 | 0.2116 | 0.2009 |
| 65° C. Δ G' (MPa) (strain sweep) | 0.0922 | 0.0965 | 0.0720 | 0.0747 | 0.0634 | 0.0575 | 0.0487 | 0.0490 |
| 65° C. tanδ @ 5% strain | 0.1543 | 0.1492 | 0.1433 | 0.1370 | 0.1373 | 0.1347 | 0.1326 | 0.1393 |
| Abrasion Index | 100 | 97.2 | 101 | 100 | 98.5 | 104 | 102 | 102 |

Mooney viscosity measurement was conducted at 130° C. using a large rotor. The Mooney viscosity was recorded as the torque when the rotor has rotated for 4 minutes. The sample is preheated at 130° C. for 1 minute before the rotor starts.

The bound rubber content test was used to determine the percent of polymer bound to filler particles in tire tread stocks. Bound rubber was measured by immersing small pieces of uncured stocks in a large excess of toluene for three days. The soluble rubber was extracted from the sample by the solvent. After three days, any excess toluene was drained off and the sample was air dried and then dried in an oven at approximately 100° C. to a constant weight. The remaining pieces form a weak coherent gel containing the filler and some of the original rubber. The amount of rubber remaining with the filler is the bound rubber. The bound rubber content is then calculated according to the following:

$$\% \text{ Bound Polymer} = \frac{100(Wd - F)}{R} \quad (1)$$

where Wd is the weight of dried gel, F is the weight of filler in gel or solvent insoluble matter (same as weight of filler in original sample), and R is the weight of polymer in original sample.

The tensile mechanical properties were measured using the standard procedure described in the ASTM-D 412 at 25° C. and 100° C. The tensile test specimens had dumbbell shapes with a thickness of 1.9 mm. A specific gauge length of 25.4 mm is used for the tensile test. Heat aged data was obtained after heating the vulcanizates for 24 hours at 100° C.

The tear strengths of the rubbers measured at a temperature of 100° C. along with the elongation at break ($E_b$) data are listed in Table 12. The tear strengths of the vulcanized stocks were measured using the procedure following the ASTM-D 624 at 100° C. Test specimen were nicked round rings with a dimension of 6.3 mm in width, 2.5 mm in thickness, and 44 mm and 57.5 mm in inside and outside diameters. The specimen was tested at the specific gauge length of 44.45 mm.

Temperature sweep experiments were conducted with a frequency of 31.4 rad/sec using 0.5% strain for temperature ranging from −100° C. to −10° C., and 2% strain for the temperature ranging from −10° C. to 100° C. Payne effect (ΔG') data were obtained from the strain sweep experiment. A frequency of 3.14 rad/sec was used for strain sweep which is conducted at 65° C. with strain sweeping from 0.25% to 14.75%.

The wear resistance of test sample was evaluated by weighting the amount of wear using the Lambourn test. The wearing index was obtained from the ratio of the weight loss of the control to that of the tested sample. Samples with higher wear indices have better wear resistance properties. Samples used for Lambourn test are circular donuts with the following approximate dimensions: 22.86 mm and 48.26 mm in inside and outside diameter, and 0.195 inches in thickness. Test specimens were placed on an axle and run at a slip ratio of 65% against a driven abrasive surface.

Various modifications and alterations that do not depart from the scope and spirit of this invention will become apparent to those skilled in the art. This invention is not to be duly limited to the illustrative embodiments set forth herein.

What is claimed is:

1. A tire comprising:
a tread, where said tread includes
a vulcanized rubber;
from about 5 to about 80 parts by weight of a nylon-containing block copolymer per 100 parts by weight of said vulcanized rubber, where said block copolymer includes a nylon block having a melt temperature that is greater than 180° C.;
from about 1 to about 100 parts by weight filler per 100 parts by weight of said vulcanized rubber; and
from about 0.01 to about 10 parts by weight of free nylon particles per 100 parts by weight vulcanized rubber.

2. The tire of claim 1, where said nylon-containing block copolymer is poly(butadiene-co-styrene)-block-(polycaprolactam), poly(polybutadiene)-block-(polycaprolactam), poly(butadiene-co-isoprene)-block-(polycaprolactam), or poly(styrene-co-isoprene-co-butadiene)-block-(polycaprolactam).

3. The tire of claim 1, where the tread includes from about 10 to about 60 parts by weight of a nylon-containing block copolymer per 100 parts by weight of said vulcanized rubber.

4. The tire of claim 3, where said tread includes from about 0.05 to about 5 parts by weight of free nylon particles per 100 parts by weight vulcanized rubber.

5. The tire of claim 1, where said nylon-containing block copolymer includes at least one rubbery block and at least one nylon block.

6. The tire of claim 5, where said nylon-containing block copolymer is characterized by including from about 10 to about 90% by weight rubbery block based upon the entire weight of the block copolymer.

7. The tire of claim 5, where said nylon-containing block copolymer is characterized by including from about 30 to about 80% by weight rubbery block based upon the entire weight of the block copolymer.

8. The tire of claim 5, where said rubbery block has a glass transition temperature that is less than 0° C.

9. The tire of claim 5, where said rubbery block has a number average molecular weight of from about 5 to about 300 kg/mole.

10. The tire of claim 5, where said nylon block has a number average molecular weight of from about 3 to about 50 kg/mole.

11. A tire component comprising:
vulcanized rubber;
a nylon-containing block copolymer;
a filler, where the tread is characterized by having an elongation in excess of 100%; and
from about 0.01 to about 10 parts by weight of free nylon particles per 100 parts by weight vulcanized rubber.

12. A process for fabricating a tire, the method comprising:
mixing a rubber, a filler, a nylon-containing block copolymer, from about 0.01 to about 10 parts by weight of free nylon particles per 100 parts by weight vulcanized rubber, and a curative to form a vulcanizable composition of matter;
extruding the vulcanizable composition of matter into an uncured tread extrudate;
fabricating an uncured tire; and
curing the uncured tire.

13. The method of claim 12, where said nylon-containing block copolymer is poly(butadiene-co-styrene)-block-(polycaprolactam), poly(polybutadiene)-block-(polycaprolacram), poly(butadiene-co-isoprene)-block-(polycaprolactam), or poly(styrene-co-isoprene-co-butadiene)-block-(polycaprolactam).

14. The method of claim 12, where said nylon-containing block copolymer includes at least one rubbery block and at least one nylon block.

15. The method of claim 14, where said nylon-containing block copolymer is characterized by including from about 10 to about 90% by weight rubbery block based upon the entire weight of the block copolymer.

16. The method of claim 14, where said nylon-containing block copolymer is characterized by including from about 30 to about 80% by weight rubbery block based upon the entire weight of the block copolymer.

17. The method of claim 14, where said rubbery block has a glass transition temperature that is less than 0° C.

18. The method of claim 14, where said nylon block has a melt temperature that is greater than 190° C.

19. The tire of claim 1, where said nylon block has a melt temperature that is greater than 190° C.

20. The tire of claim 19, where said nylon block has a melt temperature that is greater than 210° C.

21. The tire of claim 20, where said nylon block has a melt temperature that is greater than 220° C.

22. The tire of claim 1, where the nylon-containing block copolymer is a di-block copolymer.

23. The tire of claim 22, where the di-block copolymer is formed by anionically polymerizing diene monomer, optionally together with copolymerizable comonomer, to form a living polymer, subsequently reacting the living polymer with a polyisocyanate or polyisothiocyanate compound to produce end-capped polymers having at least one unreacted isocyanate or isothiocyanate functionality, and then reacting the end-capped polymer with nylon-forming monomer to form the copolymer including the nylon block.

24. The tire of claim 1, where the nylon-containing block copolymer includes a rubbery block having a glass transition temperature that is less than −20° C.

25. A tire comprising:
a tread, where said tread includes a vulcanized rubber, where said vulcanized rubber is selected from the group consisting of vulcanized natural rubber, vulcanized synthetic polyisoprene, vulcanized poly(styrene-co-butadiene), vulcanized polybutadiene, vulcanized poly(styrene-co-butadiene-co-isoprene), vulcanized poly(styrene-co-isoprene), and mixtures thereof;
from about 5 to about 80 parts by weight of a nylon-containing block copolymer per 100 parts by weight of said vulcanized rubber, where said nylon-containing block copolymer is selected form the group consisting of poly(butadiene-co-styrene)-block-(polycaprolactam), poly(polybutadiene)-block-(polycaprolactam), poly(butadiene-co-isoprene)-block-(polycaprolactam), and poly(styrene-co-isoprene-co-butadiene)-block-(polycaprolactam);

from about 1 to about 100 parts by weight filler per 100 parts by weight of said vulcanized rubber; and from about 0.01 to about 10 parts by weight of free nylon particles per 100 parts by weight vulcanized rubber.

26. The tire of claim 1, where said nylon block has a melt temperature that is greater than 210° C.

27. The tire of claim 22, where said nylon block of said di-block copolymer has a number average molecular weight of from about 3 kg/mole to about 50 kg/mole.

28. The tire of claim 27, where said di-block copolymer includes from about 50 to about 90 weight percent rubbery block, with the balance of the di-block copolymer including said nylon block.

29. The tire of claim 11, where the di-block copolymer is formed by anionically polymerizing diene monomer, optionally together with copolymerizable comonomer, to form a living polymer, subsequently reacting the living polymer with a polyisocyanate or polyisothiocyanate compound to produce end-capped polymers having at least one unreacted isocyanate or isothiocyanate functionality, and then reacting the end-capped polymer with nylon-forming monomer to form the copolymer including the nylon block.

30. The process of claim 12, where the di-block copolymer is formed by anionically polymerizing diene monomer, optionally together with copolymerizable comonomer, to form a living polymer, subsequently reacting the living polymer with a polyisocyanate or polyisothiocyanate compound to produce end-capped polymers having at least one unreacted isocyanate or isothiocyanate functionality, and then reacting the end-capped polymer with nylon-forming monomer to form the copolymer including the nylon block.

31. The tire of claim 25, where the di-block copolymer is formed by anionically polymerizing diene monomer, optionally together with copolymerizable comonomer, to form a living polymer, subsequently reacting the living polymer with a polyisocyanate or polyisothiocyanate compound to produce end-capped polymers having at least one unreacted isocyanate or isothiocyanate functionality, and then reacting the end-capped polymer with nylon-forming monomer to form the copolymer including the nylon block.

32. The tire of claim 23, where said step of reacting the end-capped polymer with nylon forming monomer occurs at a temperature below the melting point of the nylon block.

33. The tire of claim 23, where said step of reacting the end-capped polymer with nylon-forming monomer occurs at a temperature between 120° and 180° C.

34. The tire of claim 11, where said step of reacting the end-capped polymer with nylon forming monomer occurs at a temperature below the melting point of the nylon block.

35. The tire of claim 11, where said step of reacting the end-capped polymer with nylon-forming monomer occurs at a temperature between 120° and 180° C.

36. The process of claim 12, where said step of reacting the end-capped polymer with nylon forming monomer occurs at a temperature below the melting point of the nylon block.

37. The process of claim 12, where said step of reacting the end-capped polymer with nylon-forming monomer occurs at a temperature between 120° and 180° C.

38. The tire of claim 25, where said step of reacting the end-capped polymer with nylon forming monomer occurs at a temperature below the melting point of the nylon block.

39. The tire of claim 25, where said step of reacting the end-capped polymer with nylon-forming monomer occurs at a temperature between 120° and 180° C.

* * * * *